United States Patent [19]
Stiner

[11] Patent Number: 5,855,332
[45] Date of Patent: Jan. 5, 1999

[54] ROTATABLE LINE SPOOL FOR A FISHING REEL

[75] Inventor: Roy E. Stiner, Tulsa, Okla.

[73] Assignee: Zebco Corporation, Tulsa, Okla.

[21] Appl. No.: 754,558

[22] Filed: Nov. 21, 1996

[51] Int. Cl.$^6$ .................................................. A01K 89/00
[52] U.S. Cl. .................... 242/322; 242/613.4; 242/614.1
[58] Field of Search ..................................... 242/283, 322, 242/613, 613.4, 614, 614.1

[56] References Cited

U.S. PATENT DOCUMENTS

| | | | |
|---|---|---|---|
| 962,452 | 6/1910 | Mossberg | 242/614.1 |
| 1,625,503 | 4/1927 | Schooley | 242/614 X |
| 2,298,481 | 10/1942 | Hayes | 242/283 X |
| 2,309,146 | 1/1943 | Whistler | 242/322 X |
| 3,782,656 | 1/1974 | Broghammer | 242/201 |
| 4,002,310 | 1/1977 | Ganser et al. | 242/613.4 X |
| 4,076,185 | 2/1978 | Dorph | 242/322 X |

Primary Examiner—Donald P. Walsh
Assistant Examiner—Emmanuel M. Marcelo
Attorney, Agent, or Firm—Wood, Phillips, VanSanten, Clark & Mortimer

[57] ABSTRACT

A rotatable line spool for a fishing reel, the spool including a line-receiving surface defining an axis of rotation for the spool. The surface extends radially outwardly to define an axial boundary for line received on the spool and terminates in the radial direction at a radially outer rim spaced from the axis by a radial distance R. The outer rim extends outward from the line-receiving surface and terminates at a first annular surface spaced axially outward from the line-receiving surface. A flywheel mass extends radially inward from the outer rim and terminates at a radius R2 from the axis in the range of 55% to 85% of R. The mass extends axially outward from the line-receiving surface and terminates at a second annular surface that is spaced axially inward from the first annular surface by an axial distance X in the range of 0%–5% of the radial distance R.

9 Claims, 2 Drawing Sheets

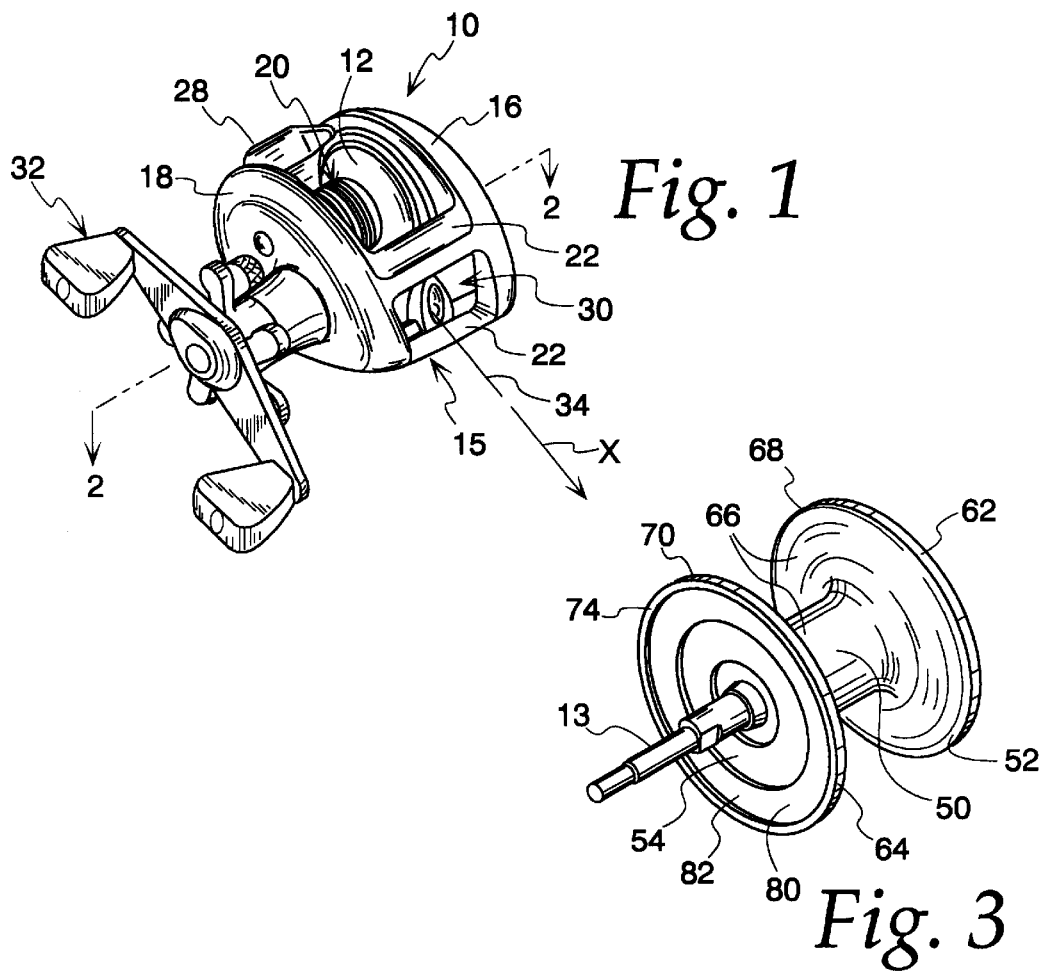
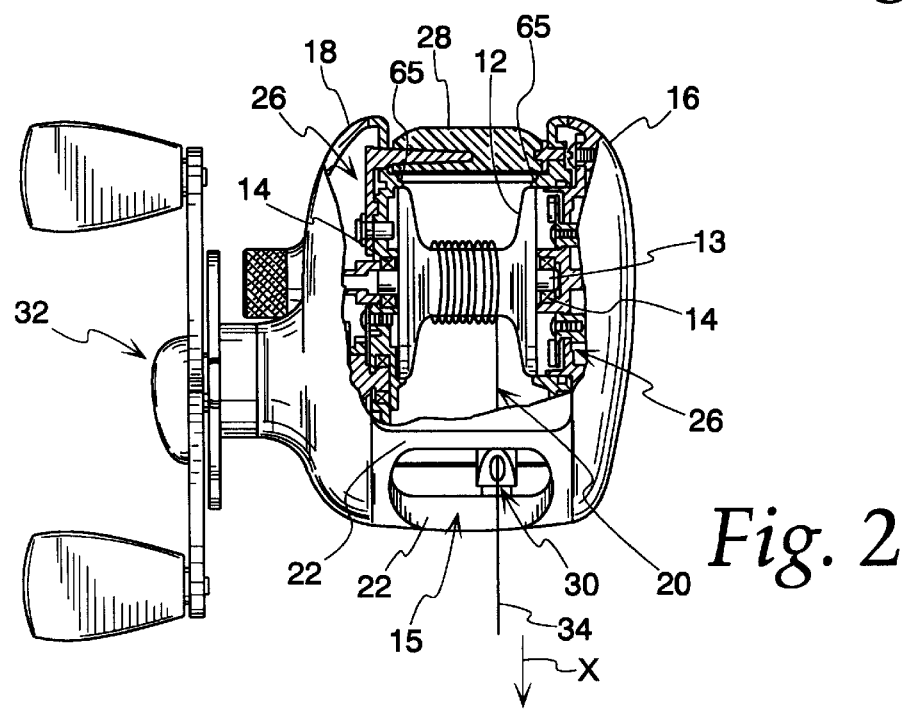

5,855,332

ROTATABLE LINE SPOOL FOR A FISHING REEL

FIELD OF THE INVENTION

This invention relates to fishing reels and, more particularly, to fishing reels having a line spool that rotates as line is paid out, such as baitcast reels.

BACKGROUND OF THE INVENTION

Fishing reels having line spools that rotate as line is paid out are well known. One common form of such reels is known as a baitcast reel and utilizes a line spool that is mounted by roller bearings or bushings to rotate about an axis perpendicular to the length of the fishing rod to which it attaches.

Two desirable features for fishing reels are light weight and long casting ability. A lightweight reel is desirable because it is common for fishing equipment to be hand carried relatively long distances to remote lakes or streams and because it is common for the reel, in combination with a rod, to be held and manipulated for relatively long periods of time while in use. Long casting performance by a reel allows a fisherman to place a lure or bait at a point that is remote from the fisherman's physical location. This allows the fisherman the most options for placement of a lure or bait without having to relocate. Thus, there is a continuing desire for lighter weight and longer casting reels.

While the industry has been successful in providing lightweight reels and in providing reels that have long casting performance, the industry has been relatively unsuccessful in providing a reel that combines both of these desirable features. This is in part because line spools made of a relatively heavy material can provide a long casting performance, but tend to make a reel undesirably heavy; while line spools made from a relatively light material can provide lightweight reels, but tend not to provide long casting performance.

SUMMARY OF THE INVENTION

In accordance with the present invention, a rotatable line spool is provided for a fishing reel. The spool includes a line-receiving surface defining an axis of rotation for the spool. The surface extends radially outwardly to define an axial boundary for line received on the spool and terminates in the radial direction at a radially outer rim spaced from the axis by a radial distance R. The outer rim extends axially outward from the line-receiving surface and terminates at a first annular surface spaced axially outward from the line-receiving surface. A fly wheel mass extends radially inward from the outer rim and terminates at a radius R2 from the axis in the range of 55% to 85% of R. The mass extends axially outward from the line-receiving surface and terminates at a second annular surface that is spaced axially inward from the first annular surface by an axial distance X in the range of 0% to 5% of the radial distance R.

In one form of the invention, the line-receiving surface, the outer rim and the fly wheel mass are a unitary piece of material.

In one form of the invention, R2 is in the range of 65% to 75% of R.

In one form of the invention, R2 is approximately 70% of R.

In one form of the invention, the distance X is approximately equal to zero.

In accordance with one aspect of the present invention, a rotatable line spool is provided for a fishing reel. The spool includes a line-receiving portion defining an axis of rotation for the spool and a pair of oppositely-spaced, annular flanges extending radially-outwardly on the body. The flanges define an outermost radius R for the spool and include structure having a sufficient mass to provide at least 70% of the total mass moment of inertia about the axis for the spool at a radius greater than 65% of R from the axis.

In one form, the line-receiving portion and the flanges are a unitary piece of material.

In one form, the flanges are dissimilar in shape from each other.

BRIEF DESCRIPTION OF THE DRAWINGS

FIG. 1 is a perspective view of a baitcast fishing reel having a line spool that rotates during casting;

FIG. 2 is a partial cross-sectional view of the reel taken from line 2—2 in FIG. 1;

FIG. 3 is a perspective view of a line spool embodying the present invention;

DETAILED DESCRIPTION OF THE PREFERRED EMBODIMENTS

Figure 4:
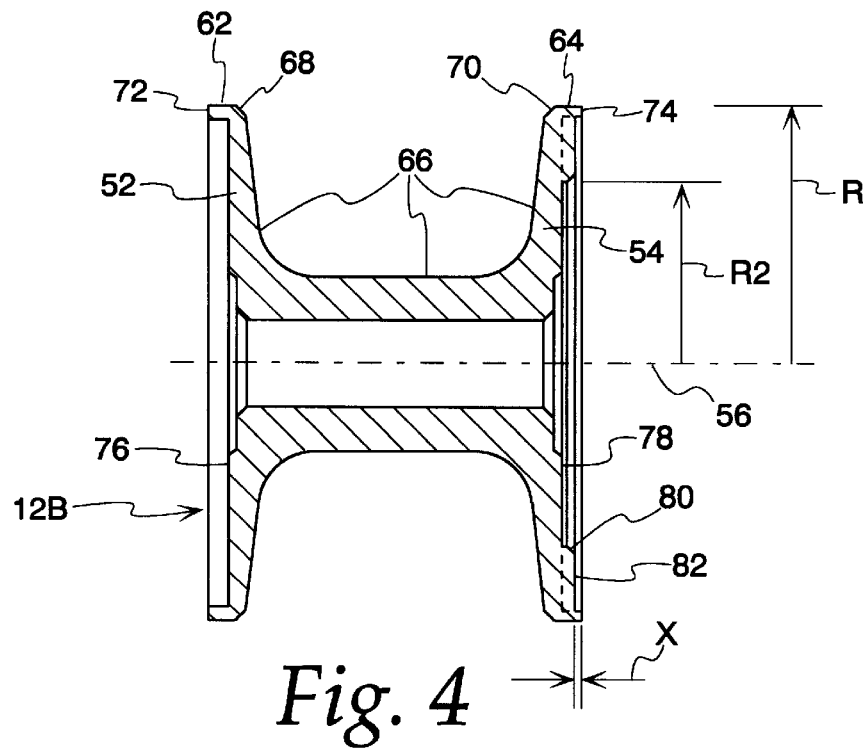
FIG. 4 is a cross-sectional view of the line spool shown in FIG. 3.

FIGS. 1 and 2 show a baitcast reel 10 having a rotatable line spool 12 that is mounted on a spool shaft 13 for rotation on roller bearings or bushings 14. The line spool 12 may be either of a conventional configuration 12A (FIG. 5) or of a configuration 12B embodying the present invention, (FIG. 4) both of which are described below. The reel 10 has a frame 15 that supports the bearings/bushings 14. The frame 15 has laterally-spaced side members 16,18 cooperatively bounding a line storage space 20. The spacing between the side members 16,18 is maintained by a plurality of laterally-extending supports 22. Each of the side members 16 and 18 enclose spaces that are occupied by a conventional reel-operating mechanism 26, including the bearings 14, as best seen in FIG. 2. A thumb button assembly 28 is mounted between the side members 16,18 at the back of the reel 10. A line guide assembly 30 is mounted for reciprocating movement between the side members 16,18 at the front of the reel 10. A crank handle assembly 32 is mounted for rotation to the side member 18. Further description of the structural details of the reel depicted is not necessary to understand the present invention. It will be appreciated that the invention may be incorporated in any fishing reel utilizing a line spool that rotates as line is paid out.

In operation, a supply of line 34, is wound on the line spool 12. The free end of the line 34 is directed forwardly through an opening in the line guide assembly 30. To cast, the thumb button 28 is depressed so that the spool 12 is released to spin freely on its bearings 14. The fisherman then moves the rod and reel combination in a whiplike manner to accelerate a lure (not shown) attached to the free end of the line 34 in the casting direction, thereby inputting a fixed amount of kinetic energy to the lure. This allows the momentum of the lure to draw the line 34 from the reel 10 in the casting direction X, thereby accelerating the line spool 12 to a maximum rotational speed on its bearings 14 and inputting kinetic energy to the line spool 12. The kinetic energy input to the line spool 12 is then dissipated principally by the rolling or turning friction in the bearings 14 as the line 34 plays off of the line spool 12.

Figure 5:
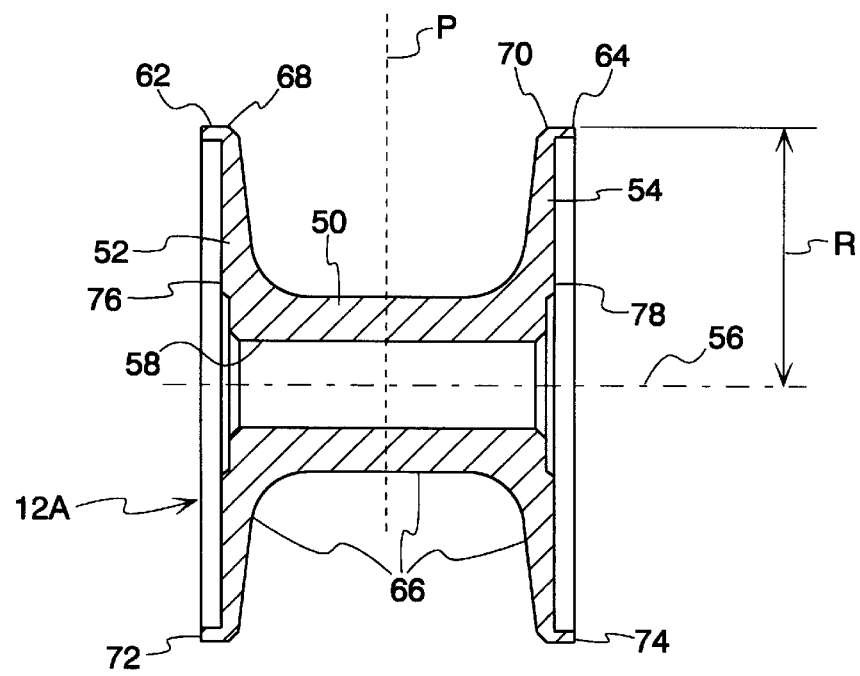
FIG. 5 is a cross-sectional view as in FIG. 4 of a conventional line spool.

As best seen in FIG. 5, a conventional prior art line spool 12A includes a cylindrical line-receiving portion or hub 50 and a pair of laterally-spaced, annular flanges 52,54 extending radially outwardly from each end of the hub 50. The hub 50 defines an axis of rotation 56 for the spool 12A. A cylindrical aperture 58 extends centrally through the hub 50 and receives the spool shaft 13 (shown in FIG. 2) which has opposite ends mounted for rotation by the bearings 14. Each of the flanges 52,54 has an annular outer rim 62,64, respectively. The radially outer surfaces of the outer rims 62,64 define an outermost radius R from the axis 56 for the spool. As best seen in FIG. 2, the outer rims 62,64 cooperate with respective annular flanges 65 on the side members 16,18 to prevent line 34 from migrating between the spool 12 and the side members 16,18 such that it might become entangled or trapped therebetween.

As best seen in FIG. 5, the conventional line spool 12A is symmetrical about the plane P, with the flange 54 being a mirror image of the flange 52. Together, the hub 50 and the flanges 52,54 define a line-receiving surface 66 that extends from the hub 50 radially outwardly at each of the flanges 52 and 54 to define an axial boundary for line 34 received on the spool 12. Chamfered edges 68,70 connect between the radially outermost parts of the line-receiving surface 66 and the outer rims 62,64, respectively. The outer rims 62,64 project axially oppositely outwardly from the line-receiving surface 66 and terminate at laterally oppositely facing annular surfaces 72,74, respectively, that are each spaced axially outwardly from the line-receiving surface 66. Each of the flanges 52,54 further includes a face surface 76,78, respectively, on the opposite sides of the line-receiving surface 66.

As will be appreciated by those skilled in the art, the conventional line spool 12A is designed to eliminate any weight that is unnecessary to maintain its structural integrity during manufacturing and use. This helps to achieve the desirable feature of a lightweight fishing reel.

A line spool 12B embodying the present invention is shown in FIGS. 3 and 4. The line spool 12B incorporates all of the major features of the conventional line spool 12A and is essentially identical to the line spool 12A with the exception of a flywheel mass 80 that has been added to the flange 54 radially within the outer rim 64 and adjacent the face surface 78. As best seen in FIG. 4, the flywheel mass 80 extends radially inwardly from the outer rim 64 and terminates at a radius R2 from the axis 56. The flywheel mass 80 also extends axially outwardly from the line-receiving surface 66 and terminates at an axially facing annular surface 82 that is spaced axially inwardly from the annular surface 74 by a distance X.

The flywheel mass 80 increases the total mass moment of inertia for the line spool 12B about the axis 56 in comparison to the conventional line spool 12A, thereby allowing for a greater amount of kinetic energy to be stored in the line spool 12B during the initial portion of a cast. This increases the spin time and the number of revolutions for the spool 12B during the cast because it takes longer for the friction in the bearings 14 to dissipate the increased amount of kinetic energy. This, in turn, increases the length of the cast because the amount of line removed from the spool 12B is increased in rough proportion to the increase in the number of revolutions of the spool.

However, long casting performance must be balanced against the desire for a lightweight reel. This consideration limits the mass and size of the flywheel mass 80 that may be desirably added to the line spool 12B. It has been determined that to achieve the desired balance between lightweight and long casting performance, X is preferably approximately equal to zero and R2 is preferably in the range of 55% to 85% of the outer radius R. In a highly preferred embodiment, R2 is in the range of 65% to 75% of R. It should be noted that because of interface concerns with other components of the reel, X may preferably be in the range of 0% to 5% of the radial distance R.

In a preferred embodiment of the line spool 12B, R2 is approximately 70% of R and X is approximately 2.7% of R.

By providing the flywheel mass 80 as close to the outer radius R as is possible within the dimensional limits imposed upon the line spool 12B, the casting performance of the line spool 12B is maximized, while the total weight of the line spool 12B is held to an acceptable value.

Accordingly, in a preferred embodiment of the line spool 12B, the flanges 52 and 54, including the flywheel mass 80, have a sufficient mass to provide at least 70% of the total mass moment of inertia about the axis 56 for the spool 12B at a radius that is greater than 65% of the radius R from the axis 56.

It should be appreciated that an additional flywheel mass 80 could be added to the flange 52. The two flywheel masses could be identical in size and shape, or dissimilar in size and shape.

What is claimed is:

1. A rotatable line spool for a fishing reel, the spool comprising;

a line-receiving surface defining an axis of rotation for the spool, the surface extending radially outwardly to define an axial boundary for line received on the spool and terminating in the radial direction at a radially outer rim spaced from the axis by a radial distance R, the outer rim extending axially outward from the line-receiving surface and terminating at a first annular surface spaced axially outward from the line-receiving surface; and a flywheel mass extending radially inward from the outer rim and terminating at a radius R2 from the axis in the range of 55% to 85% of R, said mass extending axially outward from the line-receiving surface and terminating at a second annular surface spaced axially inward from the first annular surface by an axial distance X in the range of 0% to 5% of the radial distance R.

2. The line spool of claim 1 wherein the line-receiving surface is formed of a unitary piece of material.

3. The line spool of claim 1 wherein the line-receiving surface, the outer rim, and the flywheel mass are a unitary piece of material.

4. The line spool of claim 1 wherein R2 is in the range of 65% to 75% of R.

5. The line spool of claim 1 wherein R2 is approximately 70% of R.

6. The line spool of claim 1 wherein X is approximately equal to zero.

7. A rotatable line spool for a fishing reel, the spool comprising:

a line-receiving body defining an axis of rotation for the spool; and a pair of oppositely spaced, annular flanges extending radially outwardly on the body, the flanges defining an outermost radius R for the spool, the flanges including structure having a sufficient mass to provide at least 70% of the total mass moment of inertia about the axis for the spool at a radius greater than 65% of R from the axis.

8. The line spool of claim 7 wherein the body and the flanges are a unitary piece of material.

9. The line spool of claim 7 wherein the flanges are dissimilar in shape from each other.

* * * * *